US010681653B2

(12) United States Patent
Li et al.

(10) Patent No.: US 10,681,653 B2
(45) Date of Patent: Jun. 9, 2020

(54) POWER ALLOCATION FOR UPLINK TRANSMISSIONS

(71) Applicant: QUALCOMM INCORPORATED, San Diego, CA (US)

(72) Inventors: Gaoshan Li, Beijing (CN); Congchong Ru, Beijing (CN); Hongbo Yan, Vista, CA (US); Wei-Jei Song, San Diego, CA (US); Tom Chin, San Diego, CA (US); Vivek Chawla, Rohtak (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/334,262

(22) PCT Filed: Oct. 5, 2017

(86) PCT No.: PCT/CN2017/105268
§ 371 (c)(1),
(2) Date: Mar. 18, 2019

(87) PCT Pub. No.: WO2018/064977
PCT Pub. Date: Apr. 12, 2018

(65) Prior Publication Data
US 2019/0239168 A1 Aug. 1, 2019

(30) Foreign Application Priority Data
Oct. 7, 2016 (WO) ................ PCT/CN2016/101439

(51) Int. Cl.
*H04W 52/12* (2009.01)
*H04W 52/34* (2009.01)
(Continued)

(52) U.S. Cl.
CPC ......... *H04W 52/346* (2013.01); *H04W 52/14* (2013.01); *H04W 52/146* (2013.01);
(Continued)

(58) Field of Classification Search
CPC . H04W 52/346; H04W 52/14; H04W 52/146; H04W 52/248; H04W 52/367; H04W 52/12
(Continued)

(56) References Cited

U.S. PATENT DOCUMENTS 8,811,322 B2 * 8/2014 Feuersanger ....... H04W 52/146
370/329
8,965,442 B2 * 2/2015 Chen ................... H04W 52/146
455/522

(Continued)

FOREIGN PATENT DOCUMENTS

CN 101877906 A 11/2010
CN 103781163 A 5/2014
(Continued)

OTHER PUBLICATIONS

International Search Report and Written Opinion for PCT/CN2017/1052682, dated Jan. 8, 2018.
(Continued)

*Primary Examiner* — Hai V Nguyen
(74) *Attorney, Agent, or Firm* — Qualcomm Incorporated; Ke Liu

(57) ABSTRACT

Aspects of the present disclosure relate to wireless communications and, more particularly, to how to allocate transmission power for uplink transmissions on different component carriers.

22 Claims, 6 Drawing Sheets

(51) Int. Cl.
*H04W 52/14* (2009.01)
*H04W 52/24* (2009.01)
*H04W 52/36* (2009.01)

(52) U.S. Cl.
CPC ....... *H04W 52/248* (2013.01); *H04W 52/367* (2013.01); *H04W 52/12* (2013.01)

(58) Field of Classification Search
USPC ........................................................ 455/522
See application file for complete search history.

(56) References Cited

U.S. PATENT DOCUMENTS

| | | | | |
|---|---|---|---|---|
| 8,982,801 | B2* | 3/2015 | Shin | H04W 52/08 370/329 |
| 9,001,780 | B2* | 4/2015 | Chen | H04W 72/0413 370/330 |
| 9,008,050 | B2* | 4/2015 | Feuersanger | H04W 52/281 370/336 |
| 9,014,031 | B2* | 4/2015 | Suzuki | H04W 72/0473 370/252 |
| 9,179,424 | B2* | 11/2015 | Feuersaenger | H04W 72/0413 |
| 9,439,217 | B2* | 9/2016 | Feuersaenger | H04W 52/281 |
| 9,532,320 | B2* | 12/2016 | Feuersaenger | H04L 5/0037 |
| 9,559,813 | B2* | 1/2017 | Yang | H04W 72/0413 |
| 9,603,099 | B2* | 3/2017 | Shin | H04W 52/08 |
| 9,699,738 | B2* | 7/2017 | Ouchi | H04W 52/04 |
| 9,713,094 | B2* | 7/2017 | Noh | H04W 52/146 |
| 9,794,894 | B2* | 10/2017 | Feuersaenger | H04L 5/006 |
| 10,117,193 | B2* | 10/2018 | Feuersaenger | H04W 52/281 |
| 10,178,626 | B2* | 1/2019 | Noh | H04W 52/146 |
| 10,251,197 | B2* | 4/2019 | Yerramalli | H04W 74/0816 |
| 10,271,292 | B2* | 4/2019 | Feuersaenger | H04L 5/0046 |
| 10,349,361 | B2* | 7/2019 | Feuersaenger | H04W 74/0833 |
| 2011/0038271 | A1* | 2/2011 | Shin | H04W 52/08 370/252 |
| 2011/0275403 | A1* | 11/2011 | Chen | H04W 52/146 455/522 |
| 2012/0224552 | A1* | 9/2012 | Feuersanger | H04L 5/0037 370/329 |
| 2012/0263060 | A1* | 10/2012 | Suzuki | H04L 1/1812 370/252 |
| 2013/0003657 | A1* | 1/2013 | Iwamura | H04L 5/001 370/328 |
| 2013/0058315 | A1* | 3/2013 | Feuersanger | H04W 52/327 370/336 |
| 2013/0195084 | A1* | 8/2013 | Chen | H04W 72/0413 370/336 |
| 2014/0307681 | A1* | 10/2014 | Feuersaenger | H04L 5/0046 370/329 |
| 2015/0189601 | A1* | 7/2015 | Shin | H04W 52/08 370/252 |
| 2015/0189675 | A1* | 7/2015 | Feuersaenger | H04W 52/281 370/329 |
| 2015/0201412 | A1* | 7/2015 | Suzuki | H04W 72/0413 370/329 |
| 2015/0358927 | A1* | 12/2015 | Gao | H04W 52/365 370/329 |
| 2015/0373676 | A1* | 12/2015 | Lee | H04L 5/001 370/280 |
| 2016/0021624 | A1* | 1/2016 | Feuersaenger | H04W 72/0473 370/329 |
| 2016/0081078 | A1* | 3/2016 | Qin | H04L 5/001 370/252 |
| 2016/0100420 | A1* | 4/2016 | Chen | H04W 16/14 370/329 |
| 2016/0234788 | A1* | 8/2016 | Noh | H04W 52/146 |
| 2016/0269152 | A1* | 9/2016 | Yang | H04L 5/0053 |
| 2016/0353393 | A1* | 12/2016 | Feuersaenger | H04W 52/346 |
| 2017/0027002 | A1* | 1/2017 | Yerramalli | H04W 74/004 |
| 2017/0064649 | A1* | 3/2017 | Feuersaenger | H04W 52/365 |
| 2017/0273030 | A1* | 9/2017 | Noh | H04W 52/34 |
| 2018/0007642 | A1* | 1/2018 | Feuersaenger | H04L 5/006 |
| 2019/0028980 | A1* | 1/2019 | Feuersaenger | H04W 72/0413 |
| 2019/0200304 | A1* | 6/2019 | Feuersaenger | H04L 5/006 |
| 2019/0253983 | A1* | 8/2019 | Feuersaenger | H04W 52/281 |

FOREIGN PATENT DOCUMENTS

| | | |
|---|---|---|
| CN | 105992325 A | 10/2016 |
| EP | 1811685 A | 7/2007 |

OTHER PUBLICATIONS

Notice of International Preliminary Report on Patentability for PCT/CN2017/1052682, dated Feb. 12, 2019.
"3rd Generation Partnership Project; Technical Specification Group Radio Access Network; Evolved Universal Terrestrial Radio Access (E-UTRA) ; Physical layer procedures (Release 9)", 3GPP Standard; 3GPP TS 36.213, 3rd Generation Partnership Project (3GPP), Mobile Competence Centre ; 650, Route Des Lucioles ; F-06921 Sophia-Antipolis Cedex ; France, No. V9.3.0, Sep. 17, 2010 (Sep. 17, 2010), pp. 1-80, XP050442094, [retrieved on Sep. 17, 2010].
International Search Report and Written Opinion—PCT/CN2016/101439—ISA/EPO—dated Jul. 10, 2017.

* cited by examiner

POWER ALLOCATION FOR UPLINK TRANSMISSIONS

This application claims priority to International Application No. PCT/CN2016/101439 filed Oct. 7, 2016, which is assigned to the assignee of the present application and is expressly incorporated by reference herein in its entirety.

FIELD OF THE DISCLOSURE

Aspects of the present disclosure generally relate to wireless communication and, more particularly, to allocate power for uplink transmissions.

DESCRIPTION OF RELATED ART

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations (e.g., Node B, evolved Node B (eNB), Access Point (AP), Base Station Transceiver (BST), Transmit/Receive Point (TRP)) to the terminals, and the reverse link (or uplink) refers to the communication link from the terminals to the base stations. This communication link may be established via a single-input single-output, multiple-input single-output or a multiple-input multiple-output (MIMO) system.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "DETAILED DESCRIPTION" one will understand how the features of this disclosure provide advantages that include improved communications between base stations and terminals in a wireless network.

Certain aspects of the present disclosure generally relate to power allocation for uplink transmissions.

Certain aspects of the present disclosure provide a method of wireless communications. The method generally includes satisfying a first transmission power threshold ($P_{LIMIT}$) to limit transmission power (Ppcc) for an uplink transmission on a first or primary component carrier (PCC), determining a transmission power (Pscc) for an uplink transmission on a second component carrier (SCC) when the transmission power for the uplink transmission on the first component carrier is limited, and transmitting the uplink transmission on the SCC with the Pscc. The transmission power for the uplink transmission on the second component carrier may be determined as a minimum of a transmission power adjusted by transmit power control (TPC) and the first limit value reduced by a threshold adjustment value.

Certain aspects of the present disclosure provide an apparatus for wireless communications. The apparatus generally includes means for satisfying a first transmission power threshold ($P_{LIMIT}$) to limit transmission power (Ppcc) for an uplink transmission on a first component carrier (PCC), means for determining a transmission power (Pscc) for an uplink transmission on a second component carrier (SCC) when the transmission power for the uplink transmission on the first component carrier is limited, and means for transmitting the uplink transmission on the SCC with the Pscc. The transmission power for the uplink transmission on the second component carrier may be determined as a minimum of a transmission power adjusted by transmit power control (TPC) and the first limit value reduced by a threshold adjustment value.

Certain aspects of the present disclosure provide a computer readable medium having instructions stored thereon for wireless communications. The instructions generally include instructions for satisfying a first transmission power threshold ($P_{LIMIT}$) to limit transmission power (Ppcc) for an uplink transmission on a first component carrier (PCC), determining a transmission power (Pscc) for an uplink transmission on a second component carrier (SCC) when the transmission power for the uplink transmission on the first component carrier is limited, and transmitting the uplink transmission on the SCC with the Pscc. The transmission power for the uplink transmission on the second component carrier may be determined as a minimum of a transmission power adjusted by transmit power control (TPC) and the first limit value reduced by a threshold adjustment value.

Certain aspects of the present disclosure provide an apparatus for wireless communications. The apparatus generally includes at least one processor configured to satisfy a first transmission power threshold ($P_{LIMIT}$) to limit transmission power (Ppcc) for an uplink transmission on a first component carrier (PCC) and determine a transmission power (Pscc) for an uplink transmission on a second component carrier (SCC) when the transmission power for the uplink transmission on the first component carrier is limited, and a transmitter configured to transmit the uplink transmission on the SCC with the Pscc. The transmission power for the uplink transmission on the second component carrier may be determined as a minimum of a transmission power adjusted by transmit power control (TPC) and the first limit value reduced by a threshold adjustment value.

Aspects generally include methods, apparatus, systems, computer program products, and processing systems, as substantially described herein with reference to and as illustrated by the accompanying drawings.

Other aspects, features, and embodiments of the present invention will become apparent to those of ordinary skill in the art, upon reviewing the following description of specific, exemplary aspects of the present invention in conjunction with the accompanying figures. While features of the present disclosure may be discussed relative to certain aspects and figures below, all embodiments of the present disclosure can include one or more of the advantageous features discussed herein. In other words, while one or more aspects may be discussed as having certain advantageous features, one or more of such features may also be used in accordance with the various aspects of the disclosure discussed herein. In similar fashion, while exemplary aspects may be discussed below as device, system, or method aspects it should be understood that such exemplary aspects can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. The appended drawings illustrate only certain typical aspects of this disclosure, however, and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
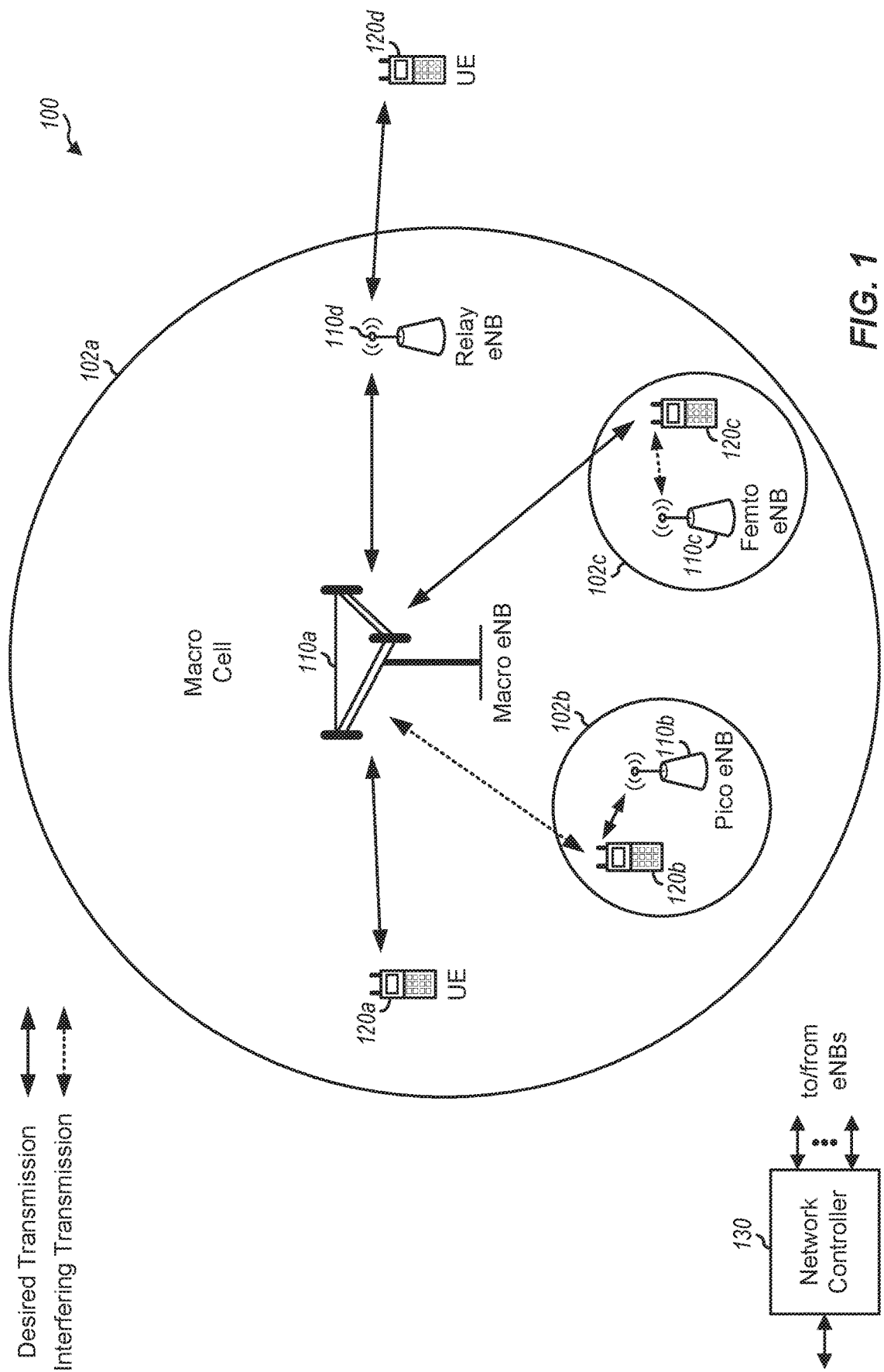
FIG. 1 illustrates an example of a wireless communication network, in accordance with certain aspects of the present disclosure.

Aspects of the present disclosure relate to transmission power control. According to certain aspects, a user equipment (UE) can allocate transmit power (e.g., between or among different component carriers in a manner that, for example, limits transmission power for an uplink transmission on one component carrier, while maintaining at least some usable transmission power for an uplink transmission power on another component carrier.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Some examples of UEs may include cellular phones, smart phones, personal digital assistants (PDAs), wireless modems, handheld devices, tablets, laptop computers, netbooks, smartbooks, ultrabooks, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link.

It is noted that while aspects may be described herein using terminology commonly associated with 3G and/or 4G wireless technologies, aspects of the present disclosure can be applied in other generation-based communication systems, such as 5G and later.

Example Wireless Communications Network

FIG. 1 illustrates an example wireless communication network 100, in which aspects of the present disclosure may be practiced. For example, one or more UEs 120 may be configured to allocate transmission power between different component carriers when sending uplink transmissions in accordance with aspects of the present disclosure.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

Figure 2:
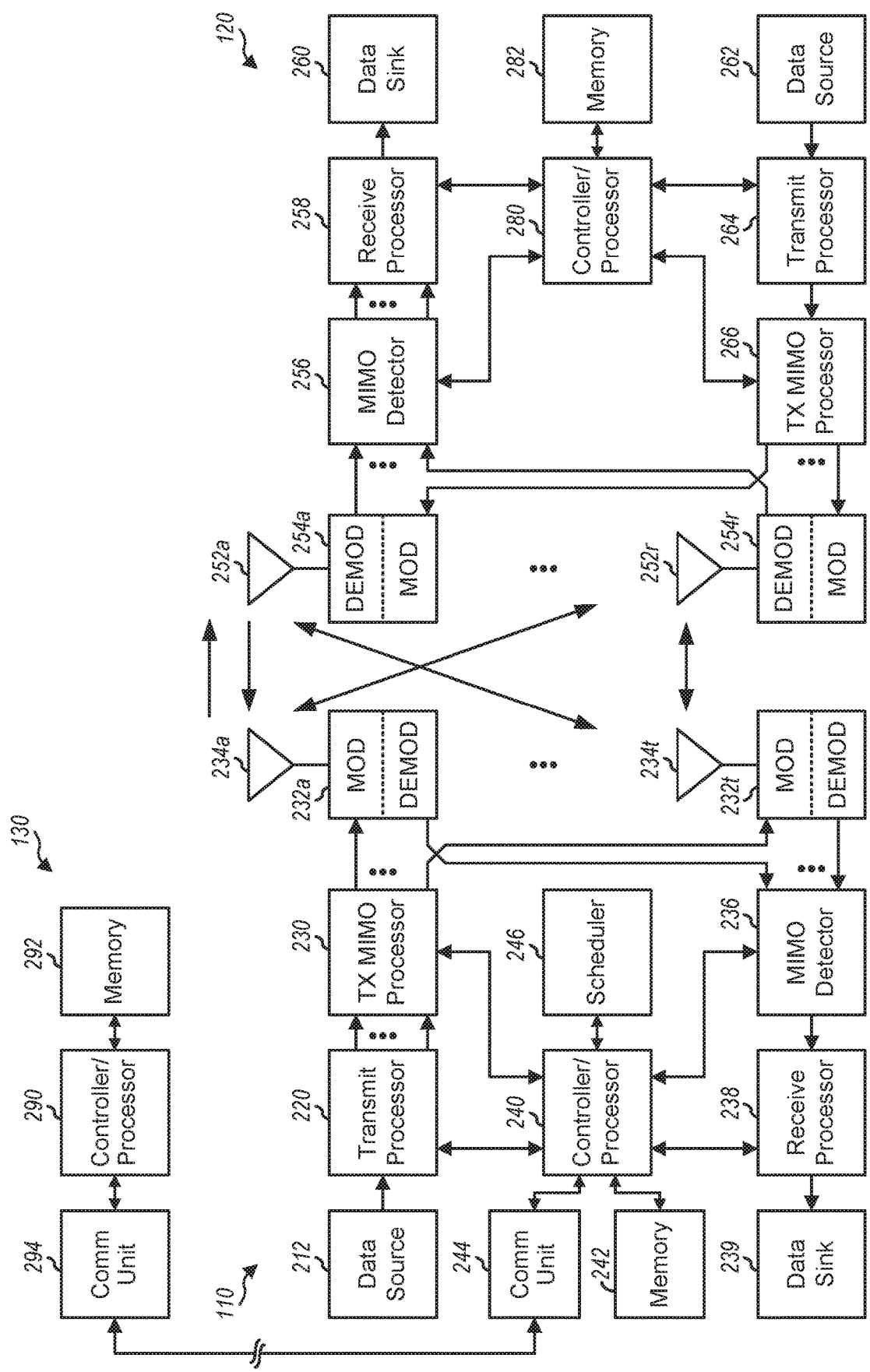
FIG. 2 shows a block diagram conceptually illustrating an example of a base station (BS) in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, Rnn, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Figure 6:
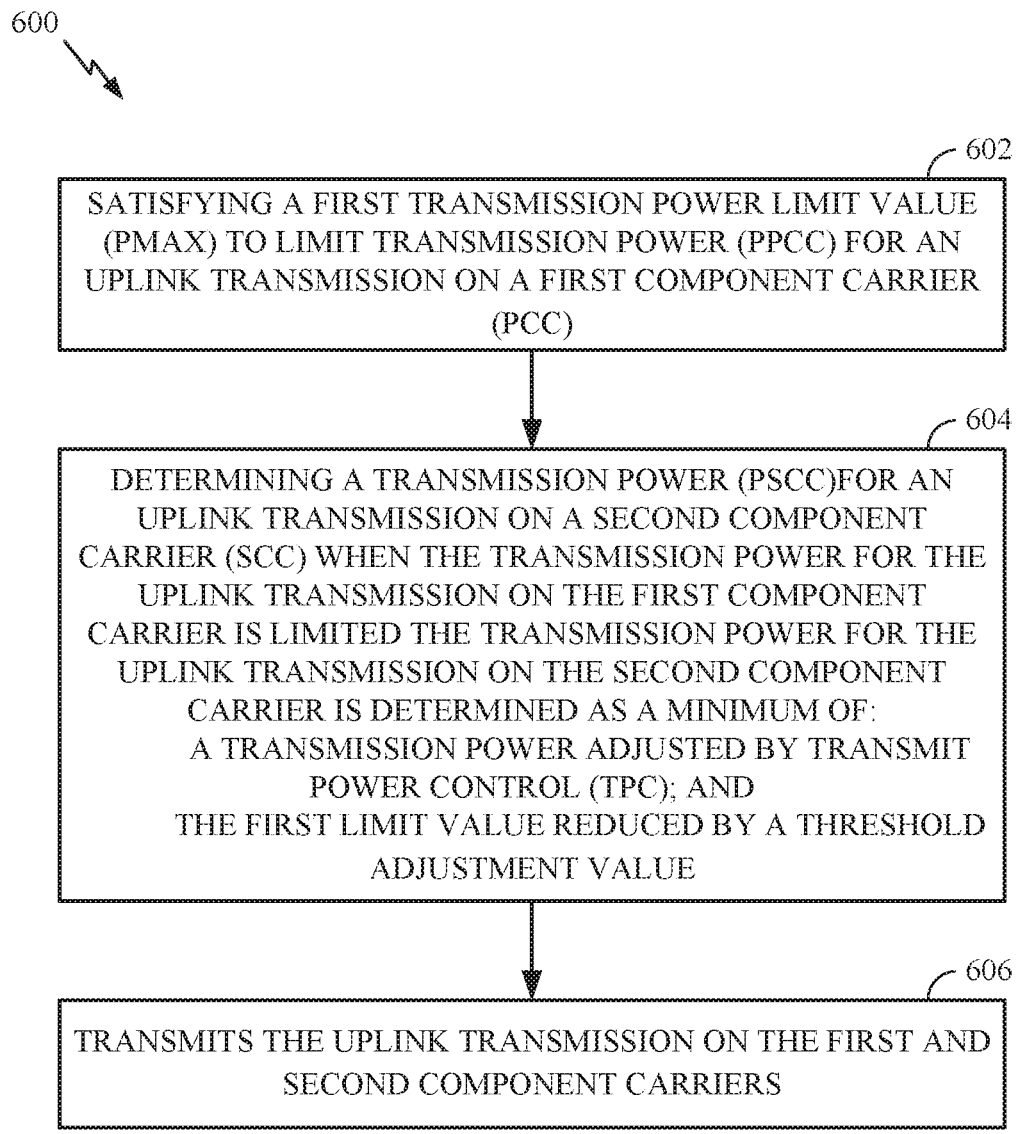
FIG. 6 illustrates example operations performed by a user equipment (UE) to allocate power for uplink transmissions (e.g., to allocate transmission power to different component carriers), in accordance with certain aspects of the present disclosure.

Controller/processor 280 may direct the operation UE 120 to perform techniques presented herein for transmission power control for uplink transmissions, for example, sent using carrier aggregation (e.g., in accordance with the operations shown in FIG. 6).

Memories 242 and 282 may store data and program codes for base station 110 and UE 120, respectively. A scheduler 246 may schedule UEs for data transmission on the downlink and/or uplink.

Figure 3:
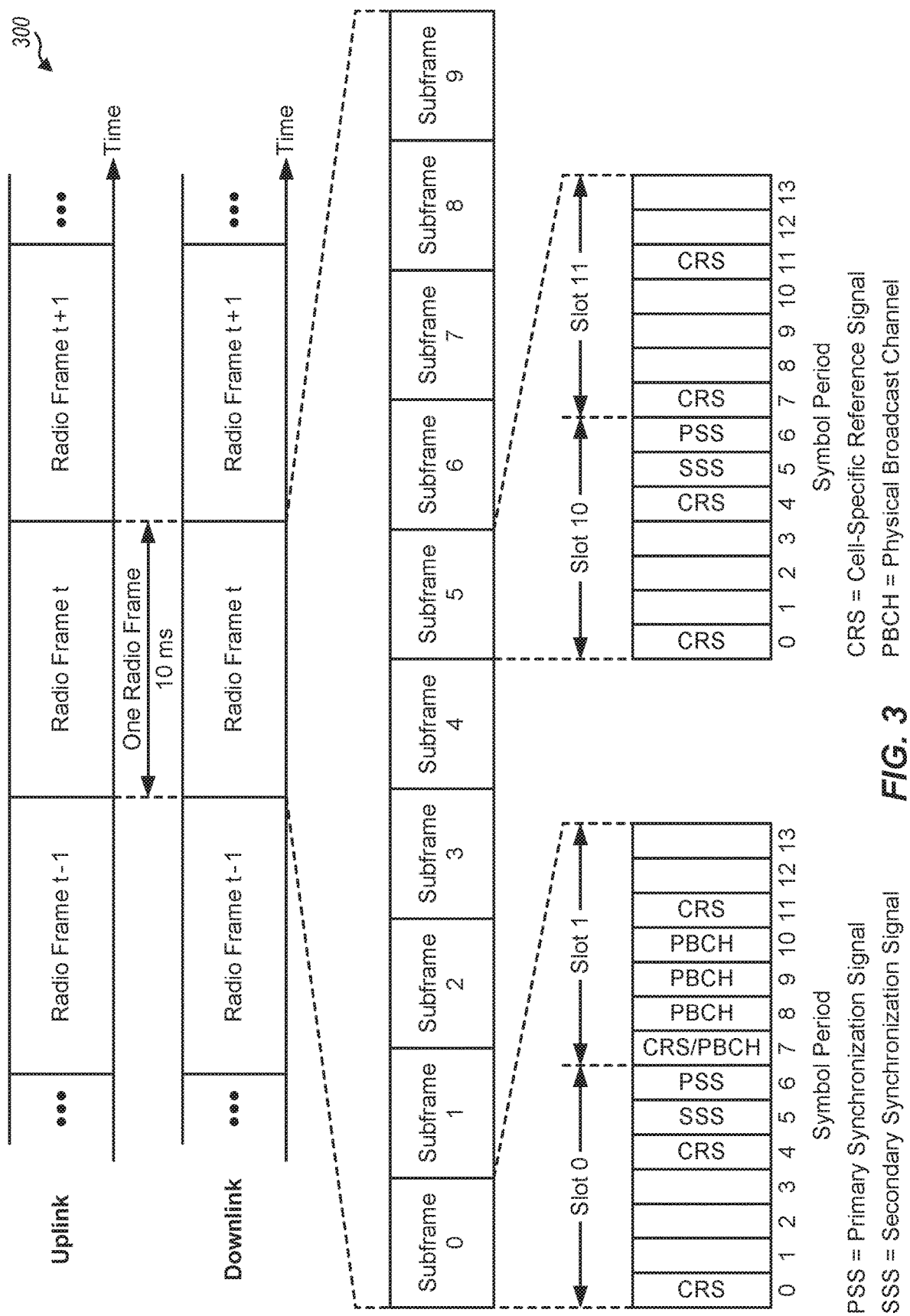
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe. In aspects, a serving cell and one or more neighbor cells are synchronous, such that SSS for the serving and the one or more neighbor cells may interfere.

Figure 4:
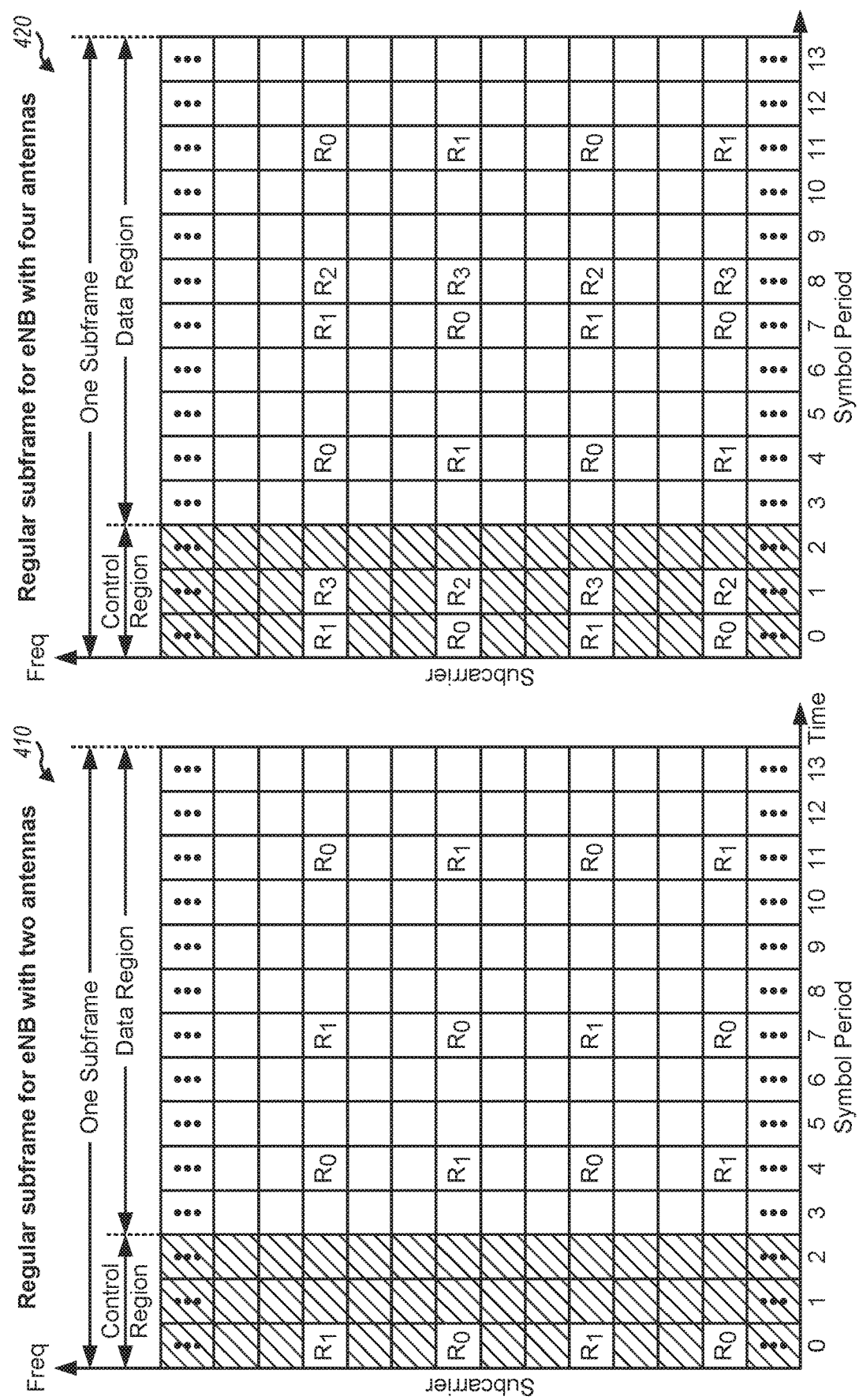
FIG. 4 is a block diagram conceptually illustrating two exemplary subframe formats with the normal cyclic prefix.

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, 9+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Figure 5:
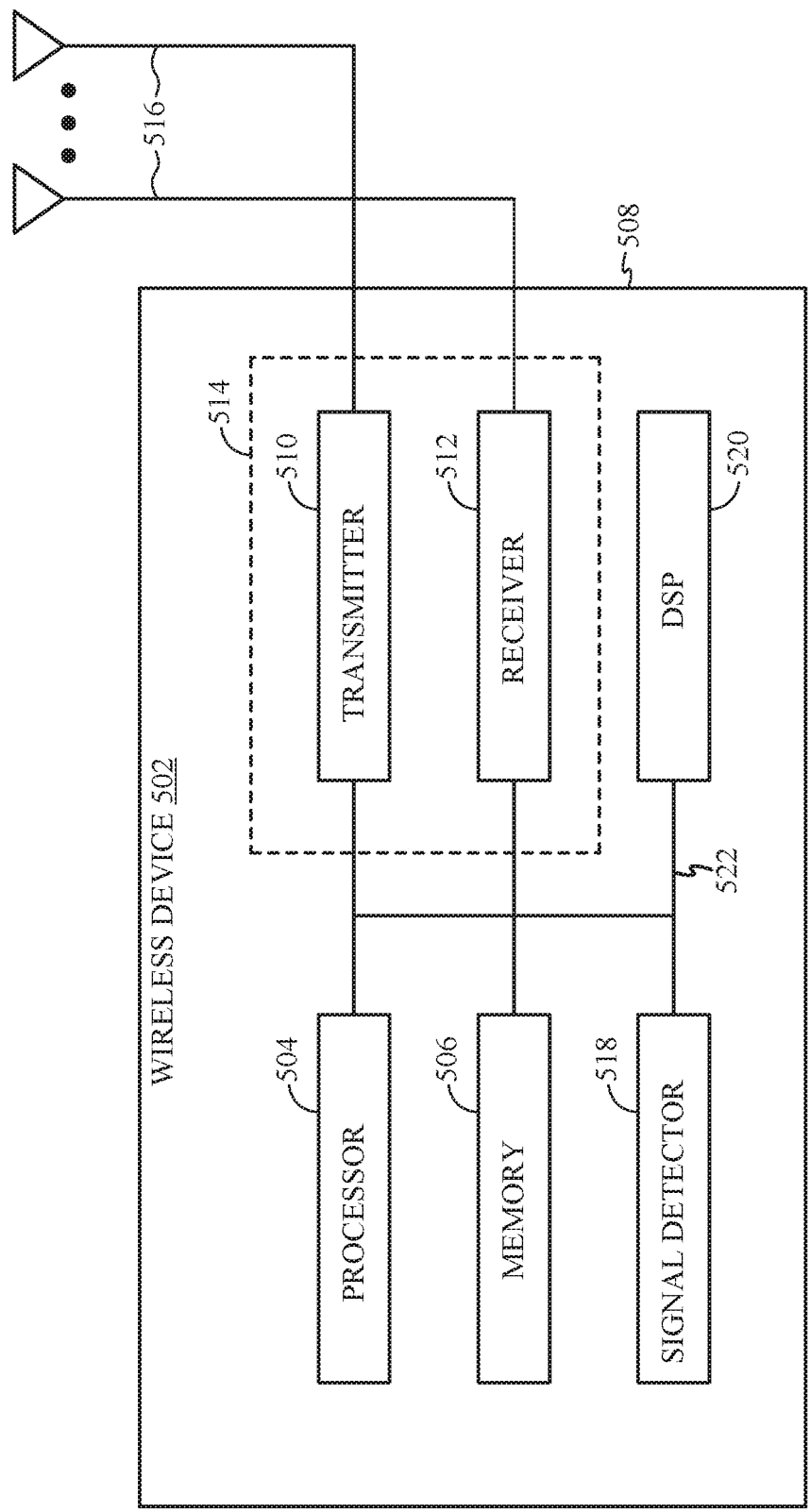
FIG. 5 illustrates various components that may be utilized in a wireless device, in accordance with certain aspects of the present disclosure.

FIG. 5 illustrates various components that may be utilized in a wireless device 502 that may be employed within the wireless communication system 100 illustrated in FIG. 1. The wireless device 502 is an example of a device that may be configured to implement the various methods described herein. The wireless device 502 may be any of the wireless nodes (e.g., UEs 120). For example, the wireless device 502 may be configured to perform operations and techniques illustrated in FIG. 6 as well as other operations described herein.

The wireless device 502 may include a processor 504 that controls operation of the wireless device 502. The processor 504 may also be referred to as a central processing unit (CPU). Memory 506, which may include both read-only memory (ROM) and random access memory (RAM), provides instructions and data to the processor 504. A portion of the memory 506 may also include non-volatile random access memory (NVRAM). The processor 504 typically performs logical and arithmetic operations based on program instructions stored within the memory 506. The instructions in the memory 506 may be executable to implement the methods described herein. Some non-limiting examples of the processor 504 may include Snapdragon processor, application specific integrated circuits (ASICs), programmable logic, etc.

The wireless device 502 may also include a housing 508 that may include a transmitter 510 and a receiver 512 to allow transmission and reception of data between the wireless device 502 and a remote location. The transmitter 510 and receiver 512 may be combined into a transceiver 514. A single transmit antenna or a plurality of transmit antennas 516 may be attached to the housing 508 and electrically coupled to the transceiver 514. The wireless device 502 may also include (not shown) multiple transmitters, multiple receivers, and multiple transceivers. The wireless device 502 can also include wireless battery charging equipment.

The wireless device 502 may also include a signal detector 518 that may be used in an effort to detect and quantify the level of signals received by the transceiver 514. The signal detector 518 may detect such signals as total energy, energy per subcarrier per symbol, power spectral density and other signals. The wireless device 302 may also include a digital signal processor (DSP) 520 for use in processing signals.

The various components of the wireless device 502 may be coupled together by a bus system 522, which may include a power bus, a control signal bus, and a status signal bus in addition to a data bus. The processor 504 may be configured to access instructions stored in the memory 506 to perform beam refinement with aspects of the present disclosure discussed below.

Example Transmit Power Control (e.g., for Uplink Carrier Aggregation)

For uplink (UL) carrier aggregation (CA) the UE is allowed to set its configured maximum output transmit (TX) power $P_{CMAX,c}$ for serving cell c and its total configured maximum output TX power $P_{CMAX}$. Current UL CA TX power control implementations typically limit both the per serving cell and the total TX power to a same parameter $P_{CMAX}$, which generally refers to an allowable maximum TX power, for UL intra-band contiguous and non-contiguous CA. The value of $P_{CMAX}$ is generally calculated by applying a maximum power reduction (MPR) to a maximum power limit corresponding to a UE power class.

If the UE has PUSCH transmissions with UCI (UL control information) on serving cell j and PUSCH without UCI in any of the remaining serving cells, and the TX power for the PUSCH transmissions with UCI after being adjusted via transmit power control (TPC) would exceed $P_{CMAX}$, PUSCH transmissions without UCI will be discarded according to a priority scheme:

$$\sum_{c \neq j} w(i) \cdot \hat{P}_{PUSCH,c}(i) \leq \left( \hat{P}_{CMAX}(i) - \hat{P}_{PUSCH,j}(i) \right)$$

where $\hat{P}_{PUSCH,j}(i)$ is the PUSCH TX power for the cell with UCI in subframe i, w(i) is a scaling factor of the PUSCH TX power $\hat{P}_{PUSCH,c}(i)$ for serving cell c without UCI and $\hat{P}_{CMAX}(i)$ is the linear value of $P_{CMAX}$ in subframe i. Since $\hat{P}_{PUSCH,j}(i)$ will be $\hat{P}_{CMAX}(i)$ in this case, w(i) need to be zero, eliminating the TX power for serving cell c without UCI.

This scenario may occur for various reasons, for example, as the result of heavy UL traffic demand (e.g., large resource block allocation, large modulator order) in addition to the cell edge scenario. Therefore, the percentage of end users who get affected may be significant. When this happens, the UE suffers from (i) loss in throughput as the serving cell without UCI is effectively disabled and/or (ii) unnecessary extra current consumption for intra-band UL CA as the circuit is configured for the aggregated transmission bandwidth, regardless of discarded serving cell without UCI or not.

As more operators deploy Uplink Carrier Aggregation (ULCA), especially in the case where the operator wants to use ULCA to make up for the limited UL resource (e.g., 2 or 4 subframes out of every 10 subframes for TDD LTE uplink-downlink configuration 2 and 1), it is desirable to address this issue, which could provide a competitive advantage.

Aspects of the present disclosure provide techniques for allocating transmission power for uplink transmissions among different component carriers, that may help address the issues described above. The techniques may be used to allocate transmission power, for example, between or among a component carrier with UCI and at least one component carrier without UCI.

FIG. 6 illustrates example operations that may be performed by a user equipment to allocate transmission power, in accordance with certain aspects of the present disclosure.

As illustrated, operations 600 start at 602, by satisfying a first transmission power limit value (e.g., PCMAX) to limit transmission power ($\hat{P}_{PUSCH,j}(i)$) for an uplink transmission on a first component carrier with UCI which is typically the primary component carrier (PCC).

At 604, the UE determines a transmission power ($\hat{P}_{PUSCH,c}(i)$) for an uplink transmission on a secondary component carrier (SCC) without UCI when the transmission power for the uplink transmission on the first component carrier is limited. As illustrated, in some cases, the transmission power for the uplink transmission on the second component carrier is determined as a minimum of: a transmission power adjusted by transmit power control (TPC) and the first limit value reduced by a threshold adjustment value. At 606, the UE transmits the uplink transmission on the first and second component carriers.

According to certain aspects, the transmission power for the uplink transmission on the SCC is determined as a minimum of a previous transmission power adjusted by transmit power control (TPC), and the $P_{LIMIT}$ is reduced by a threshold adjustment value. In such aspects, the threshold adjustment value is selected to allow detection of the uplink transmission on the second component carrier.

According to certain aspects, $P_{LIMIT}$ is determined by applying a power reduction (PR) to a network configured maximum transmission power. In such aspects, the transmission power for the uplink transmission on the second component carrier is determined such that a total uplink transmission power of the uplink transmissions on the first and second component carriers does not exceed the network configured maximum transmission power.

Additionally or alternatively, in such aspects, the threshold adjustment value is determined such that a total uplink transmission power of the uplink transmissions on the first and second component carriers exceeds $P_{limit}$ but does not exceed the network configured maximum transmission power.

In aspects, the uplink transmission on a first component carrier carries uplink control information (UCI). In aspects, the UCI is associated with a hybrid automatic repeat request (HARQ) procedure.

According to certain aspects, the operations 600 further includes determining a transmission power threshold for limiting transmission power for an uplink transmission on the SCC. In such aspects, the operations 600 further includes determining the $P_{scc}$ for the uplink transmission on the SCC when the transmission power for the uplink transmission on the first component carrier is limited includes determining the $P_{scc}$ for the uplink transmission on the SCC based on the transmission power threshold for limiting transmission power for an uplink transmission on the SCC. In aspects, transmitting includes transmitting pursuant to an UL carrier aggregation configuration The following is an example algorithm that may be used to determine the transmission power (e.g. $\hat{P}_{PUSCH,j}(i)$) for an uplink transmission on the second component carrier (e.g., SCC) when the transmission power for the uplink transmission with UCI on the first component carrier is limited (e.g., if the power on PCC ($\hat{P}_{PUSCH,j}(i)$) satisfies a threshold and/or is limited to Pmax:

$$\text{If } \hat{P}_{PUSCH,j}(i) >= \hat{P}_{CMAX}(i) \{$$
$$\hat{P}_{PUSCH,j}(i) = \hat{P}_{CMAX}(i);$$
$$P_{PUSCH}(i) = P_{CMAX}(i) - \text{Threshold};$$
$$\sum_{c \neq j} w(i) \cdot \hat{P}_{PUSCH,c}(i) \leq \hat{P}_{PUSCH}(i);$$
$$\}$$

where $\hat{P}_{PUSCH}(i)$ is the linear value of $P_{PUSCH}(i)$.

This approach may be explained with reference to an example. The example assumes that a maximum allowable transmission power for a UE (e.g., configured by the network or according to the UE power class), for example, is 23 dBm. The example also assumes that MPR (e.g., from a table in a specification) according to PUSCH scheduling on both a PCC and a SCC is 3 dB.

Applying this value to the maximum transmission power (23 dBm), yields $P_{CMAX}$=20 dBm (e.g., first transmission power limit value=20 dBm). Further, assuming at the moment that TPC (TX power control) for PCC requires 22 dBm for PCC that has UCI. Two scenarios are examined:
 (i) 10 dBm for SCC. In this example, then, $P_{PUSCH,PCC}$=20 dBm and $P_{PUSCH,SCC}$=10 dBm (and UL transmission on SCC is not limited).
 (ii) 19 dBm for SCC. In this example, then $P_{PUSCH,PCC}$=20 dBm. Therefore, the equation above yields: $P_{PUSCH,SCC}$=$P_{CMAX}$-Threshold=20 dBm-7 dB=13 dBm—assuming 7 dB threshold (e.g, which serves as a threshold adjustment value). This allows SCC to still be used to deliver data. In aspects, the threshold adjustment value is determined such that a total (e.g., linear addition) uplink transmission power of the uplink transmissions on the first and second component carriers exceeds first transmission power limit value but does not exceed the network configured maximum transmission The net effect of this algorithm is that it essentially applies different limits on per serving cell and on the total power. This approach may exploit that MPR is essentially an allowance, but not a requirement and that there is NO requirement to apply the same MPR on each CC and on the total.

The proposed techniques brings in two benefits. The first benefit may be an enhanced UL throughput by means of either one of the following—in either case SCC now delivers throughput versus none without the proposal. First of all, SCC
 a. SCC power capping to ($P_{CMAX}$-Threshold) is compensated for by re-transmissions; (e.g., in the eventuality the uplink transmission on the SCC with the $P_{scc}$ is not successfully received)
 b. Network lowers MCS rate on SCC in response to re-transmissions when they becomes excessive due to continued power capping By means of either a or b, SCC may now be able to deliver throughput.

Aspects of the present disclosure may also help achieve power efficiency. For intraband contiguous ULCA, the Tx chain is always configured for the aggregated transmission bandwidth regardless of TX activities on SCC. Thus, not transmitting PUSCH on SCC when there is a PUSCH grant is a waste of current consumption. Furthermore, given relatively low PA efficiency, transmitting SCC at a fraction of a dB higher than total TX power (e.g., Pmax) advantageously increases efficiency in terms of bits/sec/joule while overhead of turning on the PA virtually does not change.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "identifying" encompasses a wide variety of actions. For example, "identifying" may include calculating, computing, processing, deriving, investigating, looking up (e.g., looking up in a table, a database or another data structure), ascertaining and the like. Also, "identifying" may include receiving (e.g., receiving information), accessing (e.g., accessing data in a memory) and the like. Also, "identifying" may include resolving, selecting, choosing, establishing and the like.

In some cases, rather than actually communicating a frame, a device may have an interface to communicate a frame for transmission or reception. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in figures, those operations may have corresponding counterpart means-plus-function components.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in Figures, those operations may be performed by any suitable corresponding counterpart means-plus-function components.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications, comprising:
    satisfying a first transmission power threshold ($P_{LIMIT}$) to limit transmission power ($P_{PUSCH,j}$) for an uplink transmission on a first component carrier j; and
    determining a transmission power ($P_{PUSCH,c}$) for an uplink transmission on a second component carrier c with c≠j when the transmission power for the uplink transmission on the first component carrier is limited; and
    transmitting the uplink transmission on the first and second component carriers, wherein
    the transmission power for the uplink transmission on the second component carrier is determined as a minimum of:
    a transmission power adjusted by transmit power control (TPC); and
    the $P_{LIMIT}$ reduced by a threshold adjustment value.

2. The method of claim 1, wherein the threshold adjustment value is selected to avoid violating emission requirements.

3. The method of claim 1, wherein the first transmission power threshold is determined by applying a power reduction (PR) to a UE power class defined maximum transmission power.

4. The method of claim 1, wherein the transmission power for the uplink transmission on the second component carrier is determined such that a total uplink transmission power of the uplink transmissions on the first and second component carriers does not exceed a UE power class defined maximum transmission power.

5. The method of claim 1, wherein the threshold adjustment value is determined such that a total uplink transmission power of the uplink transmissions on the first and second component carriers exceeds the $P_{LIMIT}$ but does not exceed a network configured maximum transmission power.

6. The method of claim 1, wherein the uplink transmission on the first component carrier carries uplink control information (UCI).

7. The method of claim 6, wherein the UCI is associated with a hybrid automatic repeat request procedure.

8. The method of claim 1, further comprising:
determining a transmission power threshold ($P_{scc}$) for limiting transmission power for an uplink transmission on the second component carrier.

9. The method of claim 8, wherein determining $P_{scc}$ when the transmission power for the uplink transmission on the first component carrier is limited includes determining the $P_{scc}$ based on the transmission power threshold for limiting transmission power for an uplink transmission on the second component carrier.

10. The method of claim 1, wherein the transmitting includes transmitting pursuant to an uplink carrier aggregation configuration.

11. An apparatus for wireless communications, comprising:
means for satisfying a first transmission power threshold ($P_{LIMIT}$) to limit transmission power ($P_{PUSCH,j}$) for an uplink transmission on a first component carrier j; and
means for determining a transmission power ($P_{PUSCH,c}$) for an uplink transmission on a second component carrier c with c≠j when the transmission power for the uplink transmission on the first component carrier is limited; and
means for transmitting the uplink transmission on the first and second component carriers, wherein
the transmission power for the uplink transmission on the second component carrier is determined as a minimum of:
a transmission power adjusted by transmit power control (TPC); and
the $P_{LIMIT}$ reduced by a threshold adjustment value.

12. The apparatus of claim 11, wherein the threshold adjustment value is selected to avoid violating emission requirements.

13. The apparatus of claim 11, wherein the first transmission power threshold is determined by applying a power reduction (PR) to a UE power class defined maximum transmission power.

14. The apparatus of claim 11, wherein the transmission power for the uplink transmission on the second component carrier is determined such that a total uplink transmission power of the uplink transmissions on the first and second component carriers does not exceed a UE power class defined maximum transmission power.

15. The apparatus of claim 11, wherein the threshold adjustment value is determined such that a total uplink transmission power of the uplink transmissions on the first and second component carriers exceeds $P_{LIMIT}$ but does not exceed a network configured maximum transmission power.

16. The apparatus of claim 11, wherein the uplink transmission on the first component carrier carries uplink control information (UCI).

17. The apparatus of claim 16, wherein the UCI is associated with a hybrid automatic repeat request procedure.

18. The apparatus of claim 11, further comprising:
means for determining a transmission power threshold ($P_{scc}$) for limiting transmission power for an uplink transmission on the second component carrier.

19. The apparatus of claim 18, wherein the means for determining $P_{scc}$ when the transmission power for the uplink transmission on the first component carrier is limited includes means for determining the $P_{scc}$ based on the transmission power threshold for limiting transmission power for an uplink transmission on the second component carrier.

20. The apparatus of claim 11, wherein the means for transmitting includes means for transmitting pursuant to an uplink carrier aggregation configuration.

21. An apparatus for wireless communications, comprising:
at least on processor configured to satisfy a first transmission power threshold ($P_{LIMIT}$) to limit transmission power ($P_{PUSCH,j}$) for an uplink transmission on a first component carrier j and determine a transmission power ($P_{PUSCH,c}$) for an uplink transmission on a second component carrier c with c≠j when the transmission power for the uplink transmission on the first component carrier is limited; and
a transmitter configured to transmit the uplink transmission on the first and second component carriers, wherein
the transmission power for the uplink transmission on the second component carrier is determined as a minimum of:
a transmission power adjusted by transmit power control (TPC); and
the $P_{LIMIT}$ reduced by a threshold adjustment value.

22. A computer readable medium having instructions stored thereon for:
satisfying a first transmission power threshold ($P_{LIMIT}$) to limit transmission power ($P_{PUSCH,j}$) for an uplink transmission on a first component carrier j; and
determining a transmission power ($P_{PUSCH,c}$) for an uplink transmission on a second component carrier c with c≠j when the transmission power for the uplink transmission on the first component carrier is limited; and
transmitting the uplink transmission on the first and second component carriers, wherein
the transmission power for the uplink transmission on the second component carrier is determined as a minimum of:
a transmission power adjusted by transmit power control (TPC); and
the $P_{LIMIT}$ reduced by a threshold adjustment value.

* * * * *